(12) United States Patent
Uluag

(10) Patent No.: US 12,092,391 B2
(45) Date of Patent: Sep. 17, 2024

(54) SYSTEM FOR CAPTURING AND PREFERABLY PROCESSING IMAGES OF A COMPARTMENT OF A REFRIGERATOR AND REFRIGERATOR

(71) Applicant: VESTEL ELEKTRONIK SANAYI VE TICARET A.S., Manisa (AR)

(72) Inventor: Onur Uluag, Manisa (AR)

(73) Assignee: VESTEL ELEKTRONIK SANAYI VE TICARET A.S., Manisa (TR)

( * ) Notice: Subject to any disclaimer, the term of this patent is extended or adjusted under 35 U.S.C. 154(b) by 106 days.

(21) Appl. No.: 17/911,107

(22) PCT Filed: Mar. 18, 2020

(86) PCT No.: PCT/EP2020/057419
§ 371 (c)(1),
(2) Date: Sep. 12, 2022

(87) PCT Pub. No.: WO2021/185436
PCT Pub. Date: Sep. 23, 2021

(65) Prior Publication Data
US 2023/0123202 A1    Apr. 20, 2023

(51) Int. Cl.
*F25D 29/00* (2006.01)
*G02B 6/06* (2006.01)
*G06V 10/774* (2022.01)
*G06V 20/52* (2022.01)
*H04N 23/55* (2023.01)

(52) U.S. Cl.
CPC .............. *F25D 29/00* (2013.01); *G02B 6/06* (2013.01); *G06V 10/774* (2022.01); *G06V 20/52* (2022.01); *H04N 23/55* (2023.01); *F25D 2700/06* (2013.01)

(58) Field of Classification Search
None
See application file for complete search history.

(56) References Cited

U.S. PATENT DOCUMENTS

| | | | |
|---|---|---|---|
| 10,039,445 B1 * | 8/2018 | Torch | A61B 5/18 |
| 10,846,552 B1 * | 11/2020 | Wu | G06V 10/454 |
| 2016/0047587 A1 | 2/2016 | Sasaki | |

(Continued)

FOREIGN PATENT DOCUMENTS

| | | |
|---|---|---|
| DE | 102013211099 A1 | 12/2014 |
| JP | 2001-317858 A | 11/2001 |
| WO | 2019057548 A1 | 3/2019 |

OTHER PUBLICATIONS

International Search Report and Written Opinion for corresponding PCT application No. PCT/EP2020/057419, mailed Nov. 18, 2020.

*Primary Examiner* — Edemio Navas, Jr.
(74) *Attorney, Agent, or Firm* — Notaro, Michalos & Zaccaria P.C.

(57) ABSTRACT

A system for capturing and preferably processing images of a compartment of a refrigerator, where the system has a camera module having one or more cameras that are fully or partially located outside the compartment of the refrigerator, and one or more optical waveguides optically connected to the cameras and the compartment of the refrigerator and configured to transfer light such that the cameras are capable of capturing pictures of the compartment's interior is disclosed.

14 Claims, 2 Drawing Sheets

(56) References Cited

U.S. PATENT DOCUMENTS

2016/0138859 A1* 5/2016 Stimpfig ................. F25D 29/00
                                                                    62/264
2018/0324340 A1* 11/2018 Carlotto .................. H04N 7/18
2020/0374435 A1* 11/2020 Grimminger .......... H04N 23/60
2021/0232212 A1*  7/2021 Stolzenberg ............ G06F 3/012
2022/0335402 A1* 10/2022 Deaville ............... G07F 19/202

* cited by examiner

SYSTEM FOR CAPTURING AND PREFERABLY PROCESSING IMAGES OF A COMPARTMENT OF A REFRIGERATOR AND REFRIGERATOR

TECHNICAL FIELD

The invention relates to a system for capturing and preferably processing images of a compartment of a refrigerator. The invention also relates to a refrigerator comprising such a system.

TECHNOLOGICAL BACKGROUND

Systems for capturing images of products stored in a refrigerator have already been proposed, for instance in order to determine the inventory of the refrigerator, create a list of products, determine the freshness of food products etc. For this purpose, one or more cameras are placed inside the refrigerator as for instance described in JP 2001-317858 A, US 2016/0047587 A1 and US 2016/0138859 A1.

Installing a camera inside the refrigerator requires space and, thus, decreases the effective volume of the refrigerator's compartment. Furthermore, the manufacturing and maintenance processes are complex, for instance due to the cabling and proper placement of the camera. The camera and respective electronics for image processing and controlling may communicate via electric lines. In case of wireless communication, the camera requires a separate power supply. Repairing and replacing cameras is costly. Furthermore, the installation of one or more cameras affects the engineering and industrial design processes.

SUMMARY OF THE INVENTION

In view of the above, it is an object of the present invention to provide a system for capturing and preferably processing images of an interior of a refrigerator and also to provide a refrigerator equipped with such a system, which are capable of overcoming one or more of the disadvantages mentioned above.

The object is solved by a system and a refrigerator defined in the independent claims. Preferred features and embodiments are defined in the dependent claims, the general description of the invention as well as the description of specific embodiments and the drawings.

The system according to the invention is adapted for capturing and preferably at least partially processing images of a compartment of a refrigerator. Here, the term "compartment" denotes the interior volume of the refrigerator, which is intended for receiving items and products to be temperature controlled, particularly cooled, such as food, beverages, medical products etc.

The system comprises a camera module which includes one or more cameras at least partially located outside the compartment of the refrigerator. In other words, at least main components of the camera such as an image sensor, power supply etc. are placed outside the compartment. The system further comprises one or more optical waveguides which are optically connected to the cameras and the compartment of the refrigerator. The waveguides are configured to transfer light such that the cameras are capable of capturing pictures of the compartment's interior.

The system according to the invention allows placing the camera(s) for taking images of the compartment's interior anywhere at or even spaced apart from the refrigerator. The location of the camera(s) can be freely chosen according to particular installation requirements without being restricted to the interior of the compartment. Thus, the effective volume of the refrigerator is not affected by the camera(s). The cabling and proper placement of the camera(s) is simplified, thereby improving manufacturing and maintenance processes. In particular, placing the camera(s) such that they are not embedded for instance inside the indoor covering of the refrigerator enables an easy replacement, maintenance and/or repairing of the camera(s). The location of the camera(s) does not affect or determine the design of the compartment.

By installing the camera(s) outside the compartment of the refrigerator, a combined Radio (RF), camera and mainboard design can be utilized, since the metal case of the refrigerator shields the RF signals.

Since the image is optically transferred, the system is particularly resistant to electromagnetic interferences (EMI).

Preferably at least one, more or each waveguide comprises multiple optical fibers each having a core and a cladding, wherein the multiple optical fibers form a fiber bundle. The multiple optical fibers belonging to a particular waveguide are preferably fully or partially fused together. Utilizing multiple or bundles of fibers enables a transfer of optical waves in little parts of the waveguide, for instance by using micro-fibers. Each fiber may represent an individual pixel of an image sensor of the camera respectively connected to the waveguide; however, such a one-to-one correspondence is not necessary. Instead, an N-to-M mapping from fiber facets to the pixel array of the image sensor may as well be implemented. Moreover, one camera may be connected to multiple fiber bundles, additionally or alternatively there may be multiple cameras in the setup.

In other words, according to a preferred embodiment one, more or each waveguide has a bundle of M optical fibers, and a corresponding camera, i.e. a camera which is optically connected to the respective waveguide, comprises an image sensor having an array of M pixels, wherein $N \neq M$.

Preferably at least one of the cameras is connected to multiple fiber bundles, thereby reducing the number of cameras without impairing the field of detection or reducing information which can be received from the compartment's interior and processed.

Preferably the camera module comprises further electronics for processing and/or pre-processing and/or storing and/or transferring image data received from one or more of the cameras. The image data may be processed locally or within a network system. By separating the location of light capturing and the camera, image data received from different positions and directions within the compartment can be combined optically and/or electronically, thereby improving the flexibility of the system.

Preferably each waveguide has a receiving head comprising an image input surface of the waveguide which is configured to receive light from the compartment's interior. Only the receiving head needs to be arranged within or in optical contact with the compartment, thereby minimizing the structural amendments of the refrigerator's compartment when installing the system or upgrading a conventional refrigerator with such a system.

Preferably the receiving head further comprises an optical system which is in optical contact with the image input surface. For instance, a lens may be provided for focusing or dispersing the incoming light. Thus, optical parameters such as the angle of view can be simply adjusted and optimized for instance with regard to the shape and size of the compartment.

Preferably multiple receiving heads each connected to a waveguide are provided. In this case, the multiple receiving heads are configured such that images from different positions and/or directions and/or angles of view can be captured; thereby improving the visualization of the compartment's interior without impairing the effective volume thereof.

Preferably the system further comprises a processing unit which is configured to determine properties of incoming images according to a model. According to a preferred embodiment, the processing unit is configured to train or allow training of the model, for instance based on individual and/or combined images.

The received image data may be collected in the period of development and through product lifetime on the customer side. These images may be used to train the machine learning model(s) which enable various use-cases. The model(s) can be trained on-edge (i.e. on device) or in network systems. In this case, the complexity of the system can be reduced. Further, an optional communication unit may be provided as to enable cloud based training and predictions.

The trained model may for instance detect product logos regarding items such as ketchup, tomato, food, bottle, sugar, seasoning, beverage, etc., text on the product cases or packaging such as "Sweetened with Honey", "No sugar", "No artificial sweeteners", etc., sizes of items or packaging, dominant colors, locations of food and drinks, degree of consumption of products etc.

The above mentioned object is also solved by a refrigerator comprising a system according to anyone of the previously described implementations.

The features, technical contributions, effects and advantages described with respect to the system are herewith also disclosed with regard to the refrigerator.

BRIEF DESCRIPTION OF THE DRAWINGS

Preferred embodiments of the invention will be explained in the following, having regard to the drawings.

DETAILED DESCRIPTION OF PREFERRED EMBODIMENTS

Figure 1:
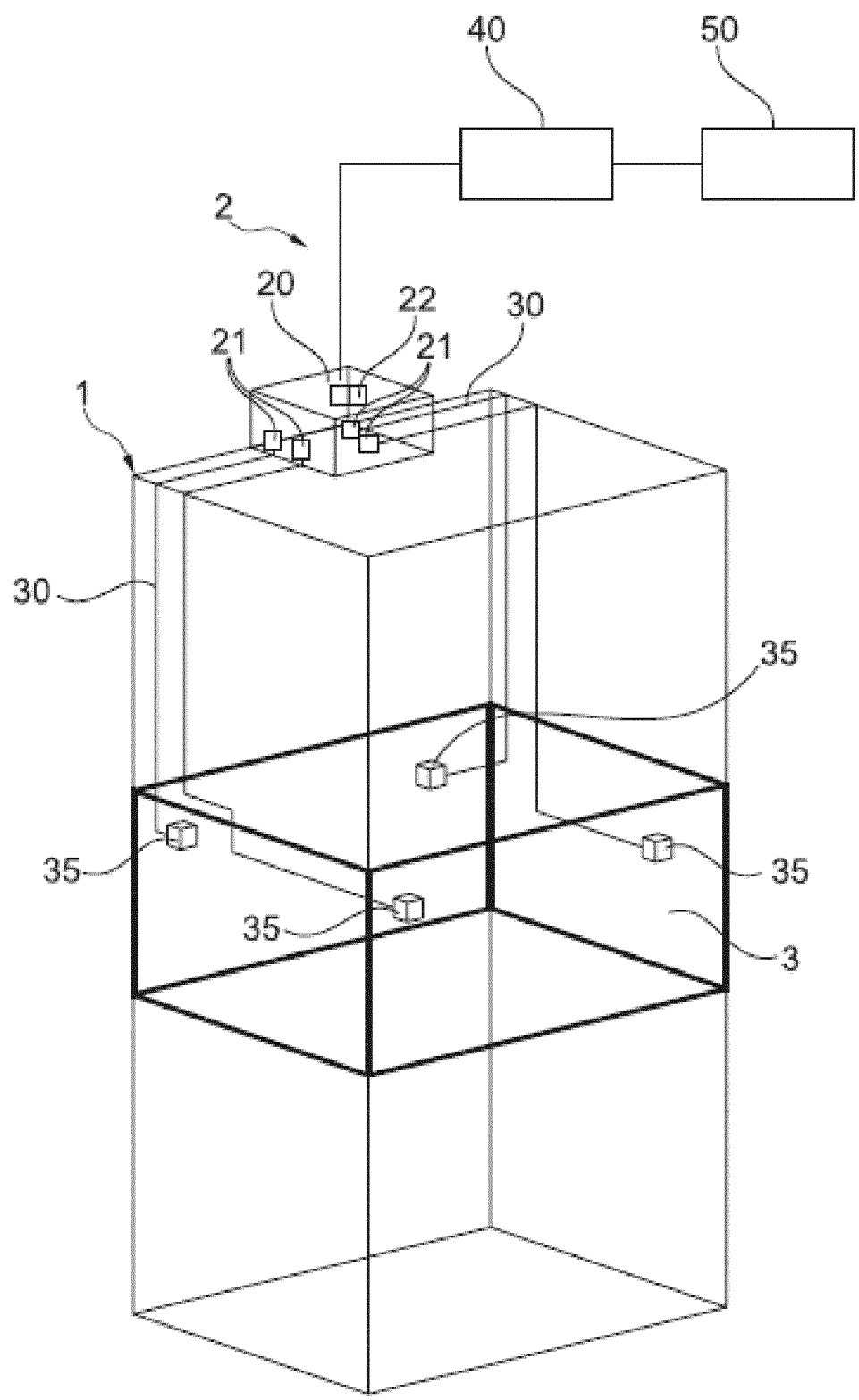
FIG. 1 is a schematic drawing illustrating a refrigerator equipped with a system for capturing and processing images of an interior of the refrigerator.

In the following, preferred embodiments of the invention will be described with reference to the drawings. Here, elements that are identical, similar or have an identical or similar effect are provided with the same reference numerals in the figures. Repeating the description of such elements may be omitted in order to avoid redundant descriptions.

FIG. 1 schematically illustrates a refrigerator 1. The refrigerator 1 may be implemented as an autonomous device, mobile or stationary, or may be part of a network such as a home appliance network system. The refrigerator 1 can be used in home or industrial applications.

The refrigerator 1 is equipped with a system 2 for capturing and processing images of an interior of the refrigerator 1, in particular a compartment 3 of the refrigerator 1.

For this purpose, the system 2 comprises at least one camera module 20 each having one or more cameras 21 and possibly further electronics 22 such as a mainboard for processing or pre-processing, storing, transferring etc. of image data received from the cameras 21.

Each camera 21 comprises an image sensor 21a (cf. to FIG. 2) such as a charge-coupled device (CCD). The image sensor 21a typically has an array of light sensitive semiconductor based pixels which are configured to convert incoming photons into charges at a semiconductor-oxide interface and read out these charges in order to obtain a representation of the captured image.

Figure 2:
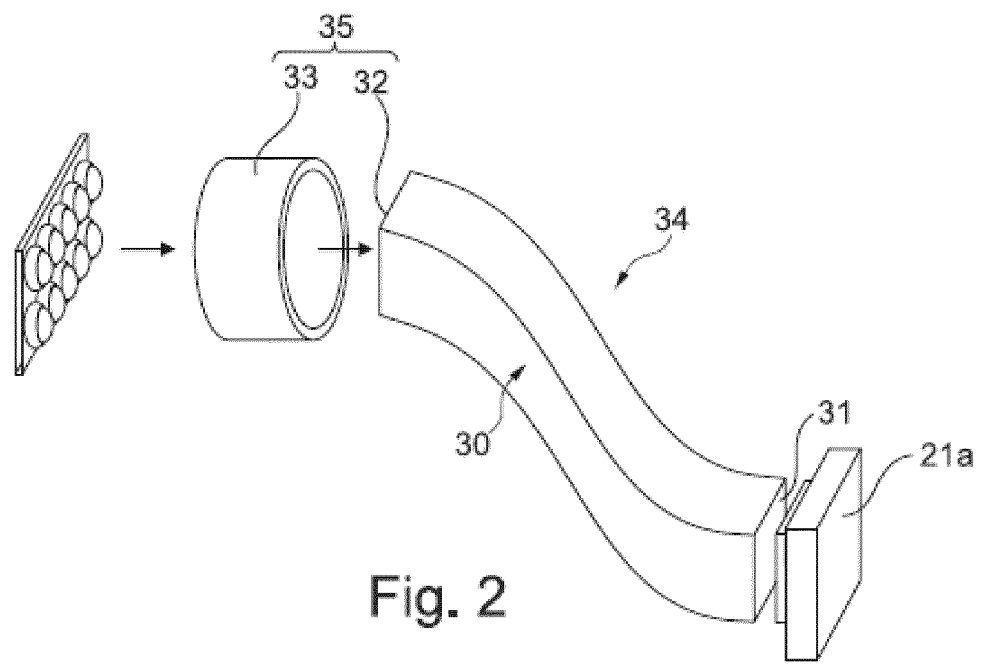
FIG. 2 is a schematic drawing of an image transfer portion forming a part of the system as illustrated in FIG. 1.

The system 2 further comprises one or more optical waveguides 30 which are configured to transfer light from the inside of the compartment 3 to the cameras 21. Referring to FIG. 2, each waveguide 30 has two image surfaces 31, 32 for receiving and outputting an image, respectively. One of the image surfaces 31, herein also referred to as the "image output surface", is located at the camera side and connected to the image sensor 21a of the camera 21. The other image surface 32, herein also referred to as the "image input surface", is located at the interior side of the refrigerator 1 and configured to receive light therefrom.

The image input surface 32 may be provided with an optical system such as a lens 33 for focusing or dispersing the incoming light. The assembly comprising the optical waveguide 30 and possible optical elements such as the lens 33 is referred to herein as image transfer portion 34. The image input surface 32 possibly comprising optical elements such as the lens 33 is referred to herein as receiving head 35. Several receiving heads 35 are schematically illustrated in FIG. 1 in order to show that images may be captured from different positions, directions and angles of view.

Optical systems such as lens 33 may be formed by using fiber glass as well as image transfer cables. This enables a particular compact and cost-effective implementation. The waveguides 30 may be flexible or rigid. If the waveguides are not subjected to further bending after installation, the provision of rigid waveguides does not affect the efficiency of the system 2.

Preferably multiple image transfer portions 34 are provided and installed inside an inner covering of the refrigerator 1. The image input surface 32 receives light from the inside of the refrigerator 1, and the optical waveguide 30 transfers the light to the image output surface 31. The image sensor 21a, which is in optical contact with the image output surface 31, detects the light, thereby capturing an image of the inside of the refrigerator's compartment 3.

According to a preferred embodiment, the waveguide 30 is realized by a so called fused fiber optical waveguide. The fused fiber optical waveguide comprises multiple fibers, i.e. a fiber bundle. Each of the fibers has a core with a high refractive index and a cladding with a lower refractive index. Light rays entering a fiber at the image input surface 32 are guided along the core via total reflections at the interface between the core and the cladding. Bundles of fibers may be combined and fused (with or without adhesives, with or without heat) in order to form a rigid or flexible waveguide 30.

Utilizing multiple fibers enables a transfer of optical waves in little parts, for instance by using micro-fibers. Each fiber may represent an individual pixel of the image sensor 21a; however, such a one-to-one correspondence is not necessary. For instance, an N-to-M mapping from fiber facets to the pixel array of the image sensor 21a may be utilized. Moreover, one camera 21 may be connected to multiple fiber bundles, alternatively there may be multiple cameras 21 in the setup.

Figure 3:
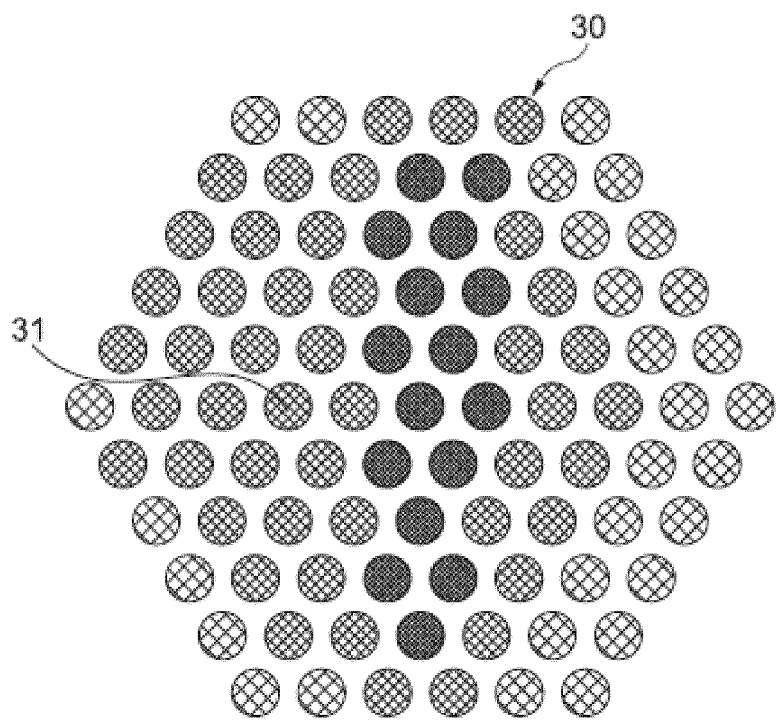
FIG. 3 illustrates an endpoint of an exemplary waveguide composed of a fiber optic bundle.

FIG. 3 illustrates an endpoint, i.e. an image output surface 31, of an exemplary waveguide 30 based on a fiber optic bundle. Multiple fibers and/or bundles are combined or joint together on the image sensor 21a side to provide joint image data. A preferred implementation uses a rectangular or hexagonal shape, as illustrated in FIG. 3, but the implementation may differ depending on the application. The image data may be collected from spatially separated zones or from the same location; the image data may be additionally or alternatively collected from different viewing directions and/or different angles of view.

The received image data may be collected in the period of development and through product lifetime on the customer side. These images may be used to train machine learning models which enable various use-cases. The model(s) can be trained on-edge (i.e. on device) or in network systems.

For this purpose, the system 2 preferably comprises a processing unit 40 which is configured to obtain and possibly train a model for determining properties of incoming images. The model may be trained by using combined images instead of separate images. In this case, the complexity of the system 2 can be reduced. Further, an optional communication unit 50 may be provided as to enable cloud based training and predictions.

The trained model may for instance detect product logos regarding items such as ketchup, tomato, food, bottle, sugar, seasoning, beverage, drink etc., text on the product cases or packaging such as "Sweetened with Honey", "No sugar", "No artificial sweeteners", etc., sizes of products or packaging, dominant colors, locations of food and drinks, degree of consumption of products etc.

The system 2 as described herein is configured to capture and process images of an interior, i.e. the compartment 3, of the refrigerator 1. The cameras 21 of the system 2 are located outside the compartment 3, i.e. the system 2 allows placing the cameras 21 anywhere at or even distant from the refrigerator 1 depending on the installation requirements. Thus, the effective volume of the refrigerator 1 is not affected by the cameras 21. The cabling and proper placement of the cameras 21 is simplified, thereby improving manufacturing and maintenance processes. In particular, placing the cameras 21 such that they are not embedded for instance inside the indoor covering of the refrigerator 1 enables an easy replacement or repairing of the cameras 21. The location of the cameras 21 does not affect or determine the design of the refrigerator 1, in particular the compartment 3.

By installing the cameras 21 outside the compartment 3 of the refrigerator 1, a combined Radio (RF), camera and mainboard design can be utilized, since the metal case of the refrigerator 1 shields the RF signals.

Since the image is optically transferred, the system 2 is particularly resistant to electromagnetic interferences (EMI).

Although the invention has been illustrated and described in detail by the embodiments explained above, it is not limited to these embodiments. Other variations may be derived by the skilled person without leaving the scope of the attached claims.

Generally, the terms "a" or "an" may be understood as singular or plural, in particular with the meaning "at least one", "one or more", etc., unless this is explicitly excluded, for example by the term "exactly one", etc.

Features shown in the embodiments, in particular in different embodiments, may be combined or substituted without leaving the scope of the invention.

LIST OF REFERENCE NUMERALS

1 Refrigerator
2 System for capturing and processing images
3 Compartment
20 Camera module
21 Camera
21a Image sensor
22 Electronics
30 Waveguides
31 Image output surface
32 Image input surface
33 Lens
34 Image transfer portion
35 Receiving head
40 Processing unit
50 Communication unit

The invention claimed is:

1. A system for capturing images of a compartment of a refrigerator, wherein the system comprises:
    a camera module comprising one or more cameras which are located outside the compartment of the refrigerator, each of the one or more cameras including an image sensor;
    one or more lenses installed inside an inner covering of the refrigerator; and
    one or more optical waveguides, each optical waveguide having an image transfer portion for optically connecting one or more lenses in the compartment of the refrigerator to an image sensor of a camera in the camera module; and
    wherein the optical waveguides are configured to transfer light between the lenses and the images sensors such that the cameras are capable of capturing pictures of an interior of the compartment.

2. The system according to claim 1, wherein at least one of the waveguides comprises multiple optical fibers each having a core and a cladding, wherein the multiple optical fibers form a fiber bundle.

3. The system according to claim 2, wherein the waveguide has a bundle of N optical fibers, and a corresponding camera comprises an image sensor having an array of M pixels, wherein N #M.

4. The system according to claim 2, wherein at least one image sensor of a camera is connected to multiple fiber bundles, each of the multiple fibre bundles being connected, at one end to the at least one image sensor and at their other end to a distinct lens, such that each fibre of the bundle connects to a different lens.

5. The system according to claim 2, wherein the multiple optical fibers forming a bundle are fully or partially fused together.

6. The system according to claim 1, wherein the camera module comprises further electronics for processing and/or pre-processing and/or storing and/or transferring image data received from one or more of the cameras.

7. The system according to claim 1, wherein each waveguide has a receiving head comprising an image input surface of the waveguide which is configured to receive light from the compartments interior.

8. The system according to claim 7, wherein multiple receiving heads are provided, which are configured such that images from different positions and/or directions and/or angles of view can be captured by one or more of the cameras.

9. The system according to claim 1, wherein the system further comprises a processing unit connected to the cameras, which is configured to determine properties of incoming images according to a model.

10. The system according to claim 9, wherein the processing unit is configured to train or allow training of the model.

11. The system according to claim 10, wherein the processing unit is configured to train or allow training of the model, based on individual and/or combined images.

12. The system according to claim 9, wherein the model is configured to detect product logos and/or text on the product cases or packaging and/or sizes and/or colors of products and/or locations of products within the compartment and/or the degree of consumption of products.

13. A refrigerator comprising a system according to claim 1.

14. The system of claim 1 wherein the system is additionally for processing images of the compartment.

* * * * *